Patented June 29, 1943

2,322,746

UNITED STATES PATENT OFFICE 2,322,746

SOLUBLE TRISAZO DYES FOR CELLULOSIC FIBERS

Swanie S. Rossander, Wilmington, Del., assignor to E. I. du Pont de Nemours & Company, Wilmington, Del., a corporation of Delaware No Drawing. Application October 11, 1940,
Serial No. 360,746

4 Claims. (Cl. 260—173)

This invention relates to new soluble azo dyes which are suitable for dyeing cotton, cellulosic and other similar dyeable fibers by direct dyeing methods and which produce dyed products of exceptional fastness and brightness when the dyeings are treated with formaldehyde, and especially to such azo dyestuffs which are represented by the formula X→Y→Z→C which will hereinafter be described, to processes of making such dyestuffs and to developed dyeings made therewith.

There are numerous azo dyes which are substantive to cotton and can be applied to cotton from water solutions of the dyes. These direct colors give dyeings on cotton in bright shades but they have only moderate fastness to light. They are very fugitive to washing. Upon washing such dyeings show considerable loss in strength, and they impart undesirable strains to uncolored fibers which are closely associated with them in washing. Direct colors capable of producing dyeings in bright shades and having non-fugitive properties to light and to washing such that they will not stain associated uncolored fibers during washing are desired.

Heretofore, certain diazotizable direct colors have been diazotized on the fiber and developed thereon by causing them to couple on the fiber with suitable azo dye coupling components. In general, many of these dyeings have good washing fastness but the dyeings are duller in shade than the direct dyeings. Another objection to such developed colors proceeds from the diazotization and coupling on the fiber. These operations require considerable manipulation in the dyehouse and a considerable expenditure of costly time and material on the part of the dyer. A change in shade from the direct dyeing is a common result of development.

It is among the objects of the present invention to provide dyestuffs which can be applied with the simplicity of direct colors, which produce dyeings having brightness comparable with direct dyeings and superior to diazo colors, and which have washing fastness comparable to diazo colors and superior to direct colors. Another object of the invention is to provide dyestuffs having such desirable characteristics which will produce dyeings on cellulosic fibers, such as cotton, regenerated cellulose and similar dyeable fibers in shades of red to brown. Another object of the invention is to provide dyestuffs which develop improved washing fastness without material change in shade upon being given a simple treatment with formaldehyde after having been dyed on the fiber. Still other objects of the invention will be apparent from the following description of the invention.

The objects of the invention are accomplished in general by providing azo dyes which contain at least two sulfonic acid groups and which are represented by the general formula X→Y→Z→C.

In the general formula X is a primary arylamine of the benzene series which is represented by the formula

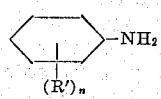

wherein R' is one or any combination of the group consisting of hydrogen, alkyl, alkoxy, sulfonic acid, carboxy and halogen; $n$ is 1 to 3 and the R' group or groups are substituted in any unoccupied position of the benzene ring.

The symbol Y is a primary arylamine of the benzene and naphthalene series which are represented by the formulae

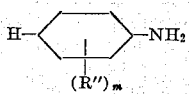

and

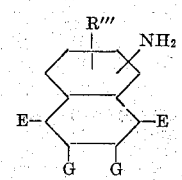

wherein H— represents the coupling position, R'' is one or any combination of a group consisting of hydrogen, alkyl and alkoxy and which may be substituted in any position of the ring except the coupling or an occupied position; $m$ is 1 to 2; R''' is one of a group consisting of hydrogen and sulfonic acid; one E is hydroxyl and the other is hydrogen; and the G which is meta to the hydroxyl group is sulfonic acid and the other G is hydrogen.

The symbol Z stands for a 1- or 2-aminonaphthol sulfonic acid which is represented by the formula

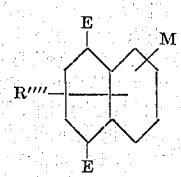

in which R'''' is one of a group consisting of hydrogen and sulfonic acid, one E is hydroxyl and the other is hydrogen and M is one of a group consisting of the radicals

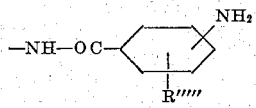

and

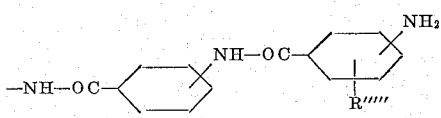

in which R'''' is one of a group consisting of hydrogen, alkyl, alkoxy and halogen.

The symbol C is a meta-dihydroxy benzene represented by the formula

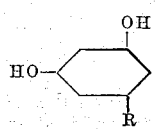

in which R is one of a group consisting of R', hydroxy, amino and CN.

In the foregoing formulae the terms alkyl and alkoxy refer to groups having 1 to 6 carbons and halogen refers to any of the halogens.

The invention will be more fully set forth in the following more detailed description which includes examples that are given as illustrative embodiments of the invention and not as limitations thereof. Parts are expressed in parts by weight unless otherwise noted.

Example I

A solution containing 321 parts of the sodium salt of 4-amino-azobenzene-4'-sulfonic acid in 6,000 parts of water was made acid by adding 91 parts of 100% hydrochloric acid as a 30% solution and cooled to 57°±2° C. The amino-azobenzene was diazotized by adding 72 parts of 100% sodium nitrite as a 30% solution and maintaining a temperature of 57°±2° C. and a faint excess of nitrite for 15 minutes. The mixture was then cooled to 25° C. by adding crushed ice.

A solution which was slightly alkaline to Brilliant Yellow paper was made by adding 17 parts of 100% ammonia to a slurry of 360 parts of 2-(4'-amino-benzoyl-amino)-5-naphthol-7-sulfonic acid in 8500 parts of water. Then 200 parts of sodium bicarbonate were added to the solution and it was cooled to 20° C.

The diazo was slowly added to the alkaline solution of the coupling component while maintaining a temperature of 15°-20° C., alkalinity to Brilliant Yellow paper and an excess of 2-(4'-amino-benzoyl-amino)-5-naphthol-7-sulfonic acid. The suspension was stirred for one hour after addition of the diazo, heated to 70°-80° C., then salted 10% with sodium chloride and filtered.

The filter cake was stirred into 4,000 parts of water until a smooth slurry was obtained and ice was added to cool it to 10° C. The slurry was acidified by adding 155 parts of 100% hydrochloric acid as a 30% solution and then 69 parts of 100% sodium nitrite were added as a 30% solution. Diazotization was effected by holding the mixture at 10°-12° C. for one hour and maintaining a distinct excess nitrite.

A water solution containing 132 parts of 1,3-dihydroxy benzene in 2,500 parts of water was iced to 0° C. and 220 parts of sodium carbonate were added.

The diazo was slowly added to the alkaline solution of 1,3-dihydroxy benzene taking care to have an excess of 1,3-dihydroxy benzene and an alkalinity to Brilliant Yellow. The mixture was stirred for one hour after the diazo was added, the suspension was heated to 70°-80° C., salted to 18% with sodium chloride and filtered. The filter cake was dried at 70°-80° C. in an oven. The dry powdery product had a brownish red appearance and is represented by the formula

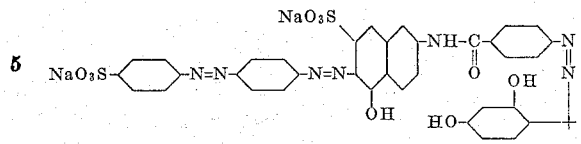

A dyebath was made by dissolving 0.2 gram of the product in 50 cc. of water at 190°-220° F. and by adding 0.4 gram of sodium carbonate to assist the solution. The solution was diluted with water and stirring to a total volume of 500 cc. and cooled to approximately 160° F. Then 40 cc. of a 10% solution of Glauber's salt were added. A 10-gram piece of regenerated cellulose rayon was wet out with water, squeezed partially dry and entered into the dye bath. The temperature of the dye bath was raised to 180-190° F. in the course of fifteen minutes and held at that temperature for one hour. The rayon was stirred in the bath at frequent intervals and at the end of one hour it was removed and rinsed in cold water.

The after-treatment of the dyeing may be carried out in a fresh bath or in the dyebath. After-treatment in a fresh bath is carried out by adding the rinsed dyeing from the above operation to 500 cc. of water at 130-140° F. Approximately 10 cc. of 10% formaldehyde (25 cc. of approximately 37% formaldehyde by weight diluted to 250 cc. with water) are added and the temperature is held for about twenty minutes or until a formaldehyde complex has formed with the dye. The dyeing is then removed, rinsed and dried.

After-treatment in the dye bath is an alternative after-treating process and is in general the preferred procedure because of its ease of application. It is carried out by adding to the dye bath at the end of the dyeing period 10 cc. of 10% formaldehyde as in the preceding description at bath temperature. The dyeings are removed after about twenty minutes, rinsed and dried.

In either after-treatment, a dyeing with a bright red shade is obtained which shows good fastness to washing, good light fastness and good discharge properties, which compares favorably in brightness with direct dyeing and favorably in washing fastness with developed dyeings of similar shade.

Example II

A product represented by the formula

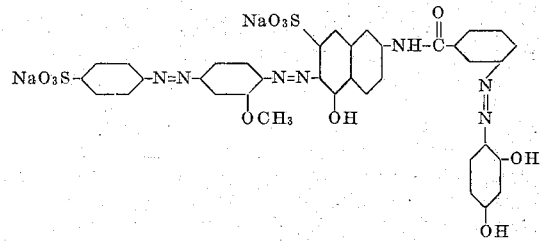

may be prepared by the same procedure as in Example I, substituting 351 parts of the sodium salt of 4-amino-3-methoxy-azo-benzene-4'-sulfonic acid for 321 parts of the sodium salt of 4-amino-azo-benzene-4'-sulfonic acid, and substituting 360 parts of 2-(3'-amino-benzoyl-amino)-5-naphthol-7-sulfonic acid for 360 parts of 2-(4'-amino-benzoyl-amino)-5-naphthol-7-sulfonic acid.

The product is a dark powder which, when dyed and after-treated as in Example I, yields dyeings of a rubine shade which has excellent fastness to washing.

Example III

A solution of 244 parts of the sodium salt of 2-amino-4-methyl-5-chloro-benzene-sulfonic acid dissolved in 2,000 parts of water by heating to 60°-65° C., was poured slowly into a solution of 132 parts of 100% HCl in 1,000 parts of water. The mixture was cooled to 10°-12° C. by the addition of crushed ice and 69 parts of 100% sodium nitrite were added as a 30% solution. Diazotization was carried out at 10°-12° C. for ½ hour whilst maintaining a slight excess of nitrite in the mixture.

A slurry containing 138 parts of 2-methoxy-5-methyl-aniline in 3,200 parts of water was acidified by adding 37 parts of 100% hydrochloric acid as a 30% solution and then heated to 60° C. to dissolve the solids. This solution was cooled to 23°-25° C. and 370 parts of sodium acetate crystals were added. The solution was then cooled to 5°-6° C. by adding ice. The diazo was slowly added to the above mixture and stirred overnight until the coupling was completed. The coupling was neutral to Congo Red paper and acid to litmus paper. The solids were then filtered off.

The filter cake was slurred in 10,000 parts of water and heated to 60°-70° C. 40 parts of sodium hydroxide were added to dissolve the solids. To the solution which was slightly alkaline to Brilliant Yellow paper was added slowly a 30% solution of sodium nitrite which contained 69 parts of 100% sodium nitrite. This mixture was cooled to 25° C. and diazotization was effected by pouring the solution slowly into a solution of 90 parts of 100% hydrochloric acid in 3,000 parts of water. A temperature of 25°-30° C. and an excess of nitrite were maintained for two hours.

A slurry containing 360 parts of 2-(4'-amino-benzoyl-amino)-5-naphthol-7-sulfonic acid in 3,500 parts of water was dissolved by adding 17 parts of 100% ammonia. To the solution which was slightly alkaline to Brilliant Yellow paper was added 15 parts of sodium bicarbonate, ice to reduce the temperature to 0° C. and 265 parts of sodium carbonate.

The diazo solution was slowly added to the alkaline solution of the coupling component whilst maintaining a temperature of 0-5° C. and an excess of 2-(4'-amino-benzoyl-amino)-5-naphthol-7-sulfonic acid in the medium. The suspension should be distinctly alkaline to Brilliant Yellow paper. The suspension was stirred one hour after the addition of the diazo, heated to 70°-80° C., salted 15% with sodium chloride and then filtered.

The filter cake was made into a thin slurry with 4,000 parts water, iced to 10° C. and acidified by adding 155 parts of 100% hydrochloric acid as a 30% solution. A 30° solution containing 69 parts of 100% sodium nitrite was added and diazotization was carried on for one hour at 10-20° C. The diazotization medium contained a distinct excess of nitrite.

A solution was made by stirring 132 parts of 1,3-dihydroxy-benzene in 2,500 parts of water, iced to 0° C. and made alkaline by adding 220 parts of sodium carbonate.

The diazo was slowly added to the alkaline solution of 1,3-dihydroxy benzene. There was an excess of 1,3-dihydroxy benzene and the suspension was alkaline to Brilliant Yellow. The mixture was stirred one hour after the addition of the diazo, then heated to 70°-80° C., salted 15% with sodium chloride and filtered. The filter cake was dried at 80°-85° C. in an oven. The dry powder was dark in appearance.

The product is represented by the formula

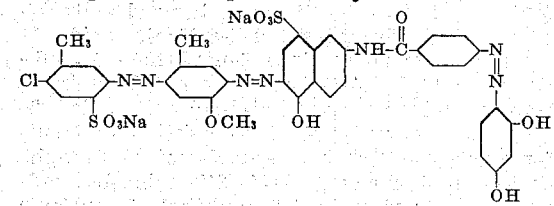

When dyed on regenerated cellulose and aftertreated in a manner similar to that described in Example I, a dyeing in a red-brown shade was obtained which showed good fastness to washing.

The products shown in the following examples were prepared by methods essentially like the method of the foregoing examples. Variations in the method which can be more conveniently employed with the particular intermediates used will be readily suggested to those skilled in the art.

| Example | X component | Y component | Z component | C component | Shade of formaldehyde aftertreated dyeing |
|---|---|---|---|---|---|
| IV | 4-amino-benzene-sulfonic acid | 1-amino-naphthalene | 2-(3'-amino-benzoyl amino)-5-naphthol-7-sulfonic acid. | 1,3-dihydroxy-benzene | Brown. |
| V | Aniline | 1-amino-naphthalene-6-sulfonic acid. | 2-(4'-amino-benzoyl amino)-5-naphthol-7-sulfonic acid. | do | Do. |
| VI | 2,5-dichloro-aniline | do | do | do | Dull red. |
| VII | 3-amino-benzene-sulfonic acid | 3-methyl-aniline | do | do | Red. |
| VIII | 3-amino-benzoic acid | 2-methoxy-aniline | do | do | Rubine. |
| IX | 2-amino-benzoic acid | 1-amino-naphthalene-7-sulfonic acid. | do | do | Brown. |
| X | 4-amino-benzene-sulfonic acid | Aniline | do | 1,3,5-trihydroxy benzene | Bordeaux. |
| XI | do | do | do | 3,5-dihydroxy-benzoic acid. | Red. |
| XII | do | do | do | 1,3-dihydroxy-5-methyl-benzene. | Do. |
| XIII | do | 2,5-dimethoxy-aniline | do | 1,3-dihydroxy-benzene | Brown. |
| XIV | do | Aniline | 1-(4'-amino-benzoyl amino)-8-naphthol-4-sulfonic acid. | do | Do. |
| XV | do | do | 1-(3'-amino-benzoyl amino)-5-naphthol-7-sulfonic acid. | do | Red. |
| XVI | Aniline-2,5-disulfonic acid | do | 2-[4'-(4''-amino-benzoyl-amino)-benzoyl amino]-5-naphthol-7-sulfonic acid. | do | Do |
| XVII | 2-amino-5-chloro-benzene sulfonic acid. | do | do | do | Do. |
| XVIII | 4-amino-benzene-sulfonic acid | do | 2-(3'-amino-4'-methoxy benzoyl-amino)-5-naphthol-7-sulfonic acid. | do | Do. |
| XIX | 4-methoxy-3-amino-benzene-sulfonic acid. | do | 2-[3'-(3''-amino-benzoyl amino)-benzoyl amino]-5-naphthol-7-sulfonic acid. | do | Do. |
| XX | 4-amino-3-methyl-benzene-sulfonic acid. | 2-methyl-aniline | 2-(3'-amino-4'-methoxy-benzoyl-amino)-5-naphthol-7-sulfonic acid. | do | Do. |

Other illustrations of X components which can be used to produce the compounds of the invention are 2-amino-benzene-sulfonic acid, 4-chloro-aniline, 5-chloro-2-amino-toluene, 2-methoxy-aniline, 4-methoxy-aniline, 2-methoxy-5-methyl-aniline, 4-amino-benzoic, 3-amino-4-chloro-benzene-sulfonic acid, 2-chloro-5-amino-benzene-sulfonic acid, 2-amino-3,5-dimethoxy-benzene-sulfonic acid, 2-amino-5-methoxy-benzene-sulfonic acid, 2-methyl-4-amino-benzene-sulfonic acid, 2-n-butoxy-3-bromo-aniline, 2-bromo-4-n-hexylaniline, 4-fluoro-aniline and 2-ethyl-4-n-propoxy-aniline.

Other illustrations of Y components are 2,5-diethoxy-aniline, 1-amino-naphthalene-8-sulfonic acid, 2-amino-8-naphthol-6-sulfonic acid, 1-amino-5-naphthol-7-sulfonic acid, 2-amino-8-naphthol-3,6-disulfonic acid, 1-amino-8-naphthol-3,6-disulfonic acid, 2-ethyl-1-naphthylamine and 1-amino-2-ethyl-5-naphthol-7-sulfonic acid.

Other illustrations of Z components are 2-[4'-(3''-amino-benzoyl-amino)-benzoyl-amino]-5-naphthol-7-sulfonic acid, 2-[3'-(4''-amino-benzoyl-amino)-benzoyl-amino]-5-naphthol-7-sulfonic acid, 1-(4'-amino-benzoyl-amino)-5-naphthol-7-sulfonic acid, 1-[4'-(4''-amino-benzoyl-amino)-benzoyl-amino]-5-naphthol-7-sulfonic acid, 1-[3'-(3''-amino-benzoyl-amino)-benzoyl-amino]-5-naphthol-7-sulfonic acid, 1-(3'-amino-benzoyl-amino)-8-naphthol-4-sulfonic acid, 1-[3'-(3''-amino-benzoyl-amino)-benzoyl-amino]-8-naphthol-4-sulfonic acid, 2-(4'-amino-benzoyl-amino)-8-naphthol-6-sulfonic acid, 2-(3'-amino-benzoyl-amino)-8-naphthol-6-sulphonic acid, 2-[3'-(3''-amino-benzoyl-amino)-benzoyl-amino]-8-naphthol-6-sulfonic acid, 2-(3'-amino-4-n-pentoxy-benzoyl-amino)-5-naphthol-7-sulfonic acid, 1-(3'-amino-5'-bromo-benzoyl-amino)-5-naphthol-7-sulfonic acid and 1-(2'-methyl-5'-amino-benzoyl-amino)-8-naphthol-4-sulfonic acid.

Other illustrations of C components are 3,5-dihydroxy-methoxy-benzene, 3,5-dihydroxy-cyano-benzene, 3,5-dihydroxy-chlorobenzene, 3,5-dihydroxy-fluoro-benzene, 3,5-dihydroxy-bromo-benzene, 3,5-dihydroxy aniline, 3,5-dihydroxy-benzene-sulfonic acid and 3,5-dihydroxy-n-hexoxy-benzene.

The dyeings produced by the compounds of the invention respond to after-treatment with certain soluble inorganic metal salt solutions, particularly the soluble organic and inorganic salts of metals having an atomic weight of 50 to 65, such as copper sulfate or acetate. After-treatment with metal salts improves the light fastness of the direct dyeings and of the formaldehyde treated dyeings, but treatment with metal salts produces a change in the depth of the shade. In general the after-treatment with metal salts can be applied before the formaldehyde treatment or afterwards, in a fresh bath, in the bath resulting from the dyeing or in a bath resulting from the formaldehyde treatment. In general the metallizing treatment may be applied by using baths similar to those used for the formaldehyde treatment and substituting a five percent solution of the metal salt for the formaldehyde solution. The treatment is continued for about 20 minutes or until a metal complex is formed.

The new compounds provide dyeings of superior washing fastness by methods which are comparable in simplicity, convenience and economy to direct dyeing methods. The formaldehyde treated dyeings are superior to dyeings made with the direct dyes heretofore used, and they are brighter than dyeings in similar shades produced by developed dyes. Some of the dyes provided by the invention produce dyeings having better washing fastness than diazo dyes of similar shade. The invention provides novel, convenient, rapid and economical methods of obtaining given shades with improved brightness and washing fastness.

By using salts and alkalis of other alkali metals instead of sodium, such as potassium salts in the manufacture of the compounds, other alkali-metal salts can be made. The products can be converted into their acid forms by methods known to the art, but for use as dyes the alkali-metal salts are desired particularly the sodium salts.

From the foregoing disclosure it will be recognized that the invention is susceptible of modification without departing from the spirit and scope thereof and it is to be understood that the invention is not restricted to the specific illustrations thereof herein set forth.

I claim:

1. The sodium salts of an azo compound which is suitable for dyeing cellulosic fibers and which is represented by the formula X→Y→Z→C wherein X is a primary arylamine represented by the formula

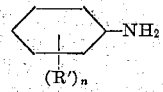

in which R' is from a group consisting of hydrogen, alkyl, alkoxy, sulfonic acid, carboxy and halogen and $n$ is 1 to 3; Y is a primary arylamine represented by the formula

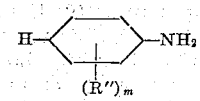

in which —H is the coupling position, R'' is from a group consisting of hydrogen, alkyl and alkoxy, $m$ is an integer not greater than 2; Z is one of a group consisting of the 1- and 2-aminonaphthol-sulfonic acids represented by the formula

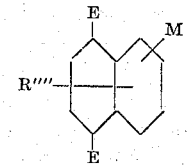

in which R'''' is one of a group consisting of hydrogen and sulfonic acid, one E is hydroxyl and the other is hydrogen and M is one of a group consisting of the radicals

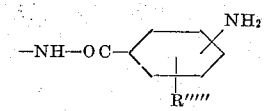

and

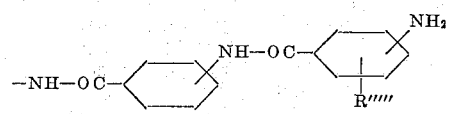

wherein R''''' is one of a group consisting of hydrogen and alkoxy; and C is a meta dihydroxy benzene represented by the formula

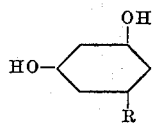

in which R is one of a group consisting of hydrogen, alkyl, alkoxy, sulfonic acid, carboxy, halogen, hydroxy, amino and —CN; said compound containing at least two sulfonic acid groups.

2. The alkali-metal salts and the acid form of the compound which in the form of its acid is represented by the formula

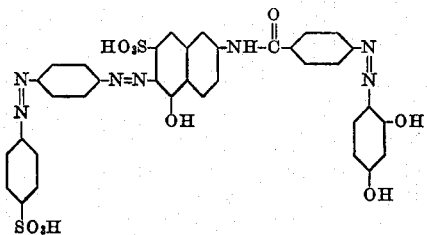

3. The alkali-metal salts and the acid form of the compound which in the form of its acid is represented by the formula

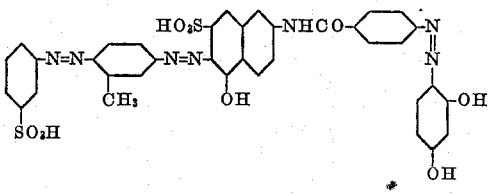

4. The alkali-metal salts and the acid form of the compound which in the form of its acid is represented by the formula

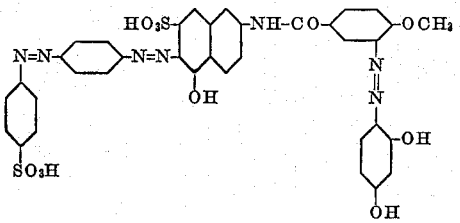

SWANIE S. ROSSANDER.

Certificate of Correction

Patent No. 2,322,746. June 29, 1943.
SWANIE S. ROSSANDER

It is hereby certified that errors appear in the printed specification of the above numbered patent requiring correction as follows: Page 2, second column, line 10, for "190°–220° F." read *190°–200° F.*; page 3, second column, lines 29–33, for that portion of the formula reading

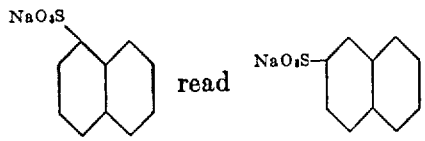

and that the said Letters Patent should be read with these corrections therein that the same may conform to the record of the case in the Patent Office.

Signed and sealed this 24th day of August, A. D. 1943.

[SEAL]

HENRY VAN ARSDALE,
*Acting Commissioner of Patents.*